Figure 1:
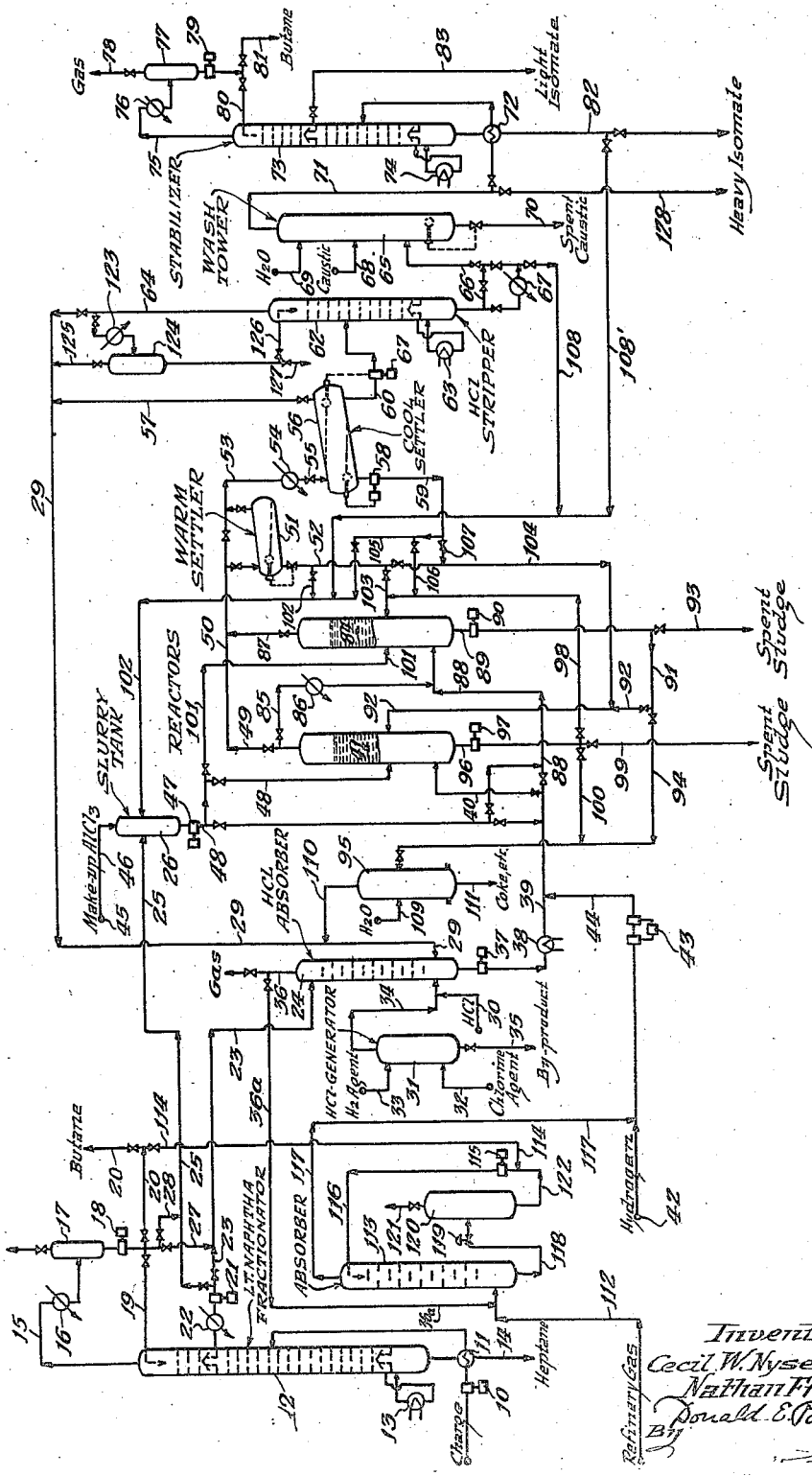

Feb. 26, 1946. C. W. NYSEWANDER ET AL 2,395,680
ISOMERIZATION OF LIGHT NAPHTHA
Filed Dec. 15, 1941 2 Sheets-Sheet 1

Inventors:
Cecil W. Nysewander
Nathan Fragen
Donald E. Payne
By
Attorney

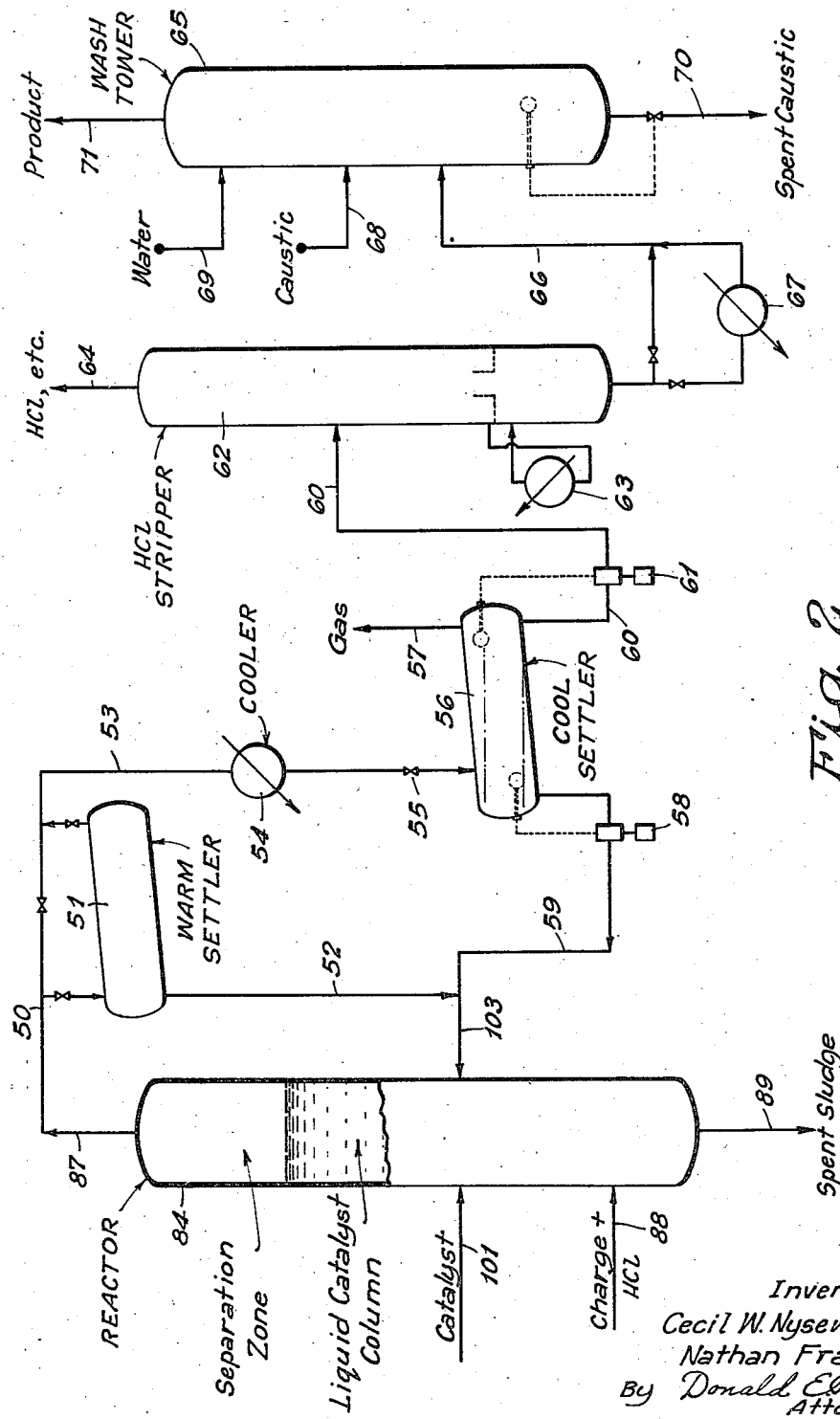

Patented Feb. 26, 1946

2,395,680

UNITED STATES PATENT OFFICE 2,395,680

ISOMERIZATION OF LIGHT NAPHTHA

Cecil W. Nysewander, Highland, and Nathan Fragen, Hammond, Ind., assignors to Standard Oil Company, Chicago, Ill., a corporation of Indiana Application December 15, 1941, Serial No. 422,979

9 Claims. (Cl. 260—683.5)

This invention relates to an improved process and apparatus for the isomerization of light paraffinic hydrocarbons by means of an aluminum halide-hydrocarbon complex activated by hydrogen chloride and under considerable hydrogen pressure.

An object of our invention is to provide an improved reactor system which will provide for a more complete and more efficient utilization of catalyst. A further object is to provide improved methods and means for effecting separation of catalyst, hydrogen halide, etc. from reaction products and for utilizing these separated materials most effectively. A further object is to provide improved methods and means for introducing catalyst material, activator, hydrogen, etc. into a reaction zone and improved methods and means for effecting intimate contact between catalyst and light paraffinic hydrocarbons in said reaction zone. A further object is to correlate operating conditions such as temperatures, pressures, charging rates, concentrations, etc. throughout the entire isomerization system in such a manner as to produce maxim yields of desired isomerization products with minimum consumption of catalyst, activator and hydrogen and with a minimum amount of cracking and gas formation. Other objects will be apparent as the detailed description of our invention proceeds.

When our invention is applied to refinery naphthas we first fractionate the naphthas to remove undesirable components; for the isomerization of a charging stock consisting essentially of $C_5$—$C_6$ hydrocarbons, for instance, it is desirable to remove substantially all of the heptanes and to have relatively low concentrations of aromatics and naphthenes. At least a substantial part of the charging stock is employed for absorbing hydrogen chloride from gases produced in the system. Another part of the charging stock may be employed for making up a slurry of fresh aluminum chloride, although recycled products may serve this purpose. The part of the charge containing hydrogen chloride is passed through a heat exchanger and is then introduced into a reactor. Make-up aluminum chloride slurry and hydrogen are also added to the reactor. The reactor is operated at a temperature within the approximate range of 100 to 400° F., preferably 200 to 300° F. at a pressure within the approximate range of 100 to 3000 pounds per square inch, preferably 500 to 1500 pounds per square inch. For $C_5$—$C_6$ hydrocarbons we have found that excellent results are obtainable at a temperature within the approximate vicinity of 250° F. and a pressure within the approximate vicinity of about 850 to 900 pounds per square inch.

The amount of hydrogen required will vary somewhat with temperature, pressure and hydrogen chloride concentration in the reaction zone, ranging from about 20 cubic feet per barrel of stock charged at low temperatures, low pressures and low hydrogen chloride concentrations to 200 or more cubic feet per barrel at high temperatures, pressures and hydrogen chloride concentrations. For optimum conditions of operation on $C_5$—$C_6$ hydrocarbons the actual hydrogen consumption will be about 100 cubic feet per barrel and in order to insure the presence of the requisite amount of hydrogen in the reactor we prefer to introduce about 100 to 300, preferably about 200 cubic feet of hydrogen per barrel of charging stock.

The amount of make-up aluminum chloride may be within the approximate range of .1 to 4 pounds per barrel of total charging stock, usually within the approximate range of .5 to 2 pounds per barrel. The amount of hydrogen chloride may be within the approximate range of 5 to 30 pounds of hydrogen chloride per barrel of total stock charged, usually within the general vicinity of 10 or 15 pounds per barrel but only a small portion of the hydrogen chloride is actually consumed so that the major portion of it may be recovered and reintroduced as will be hereinafter described.

While the materials introduced into the reactor with the charging stock are aluminum chloride, hydrogen chloride and hydrogen, the effective catalyst in the reactor is an aluminum chloride-hydrocarbon complex which may contain more or less dissolved or uncombined aluminum chloride. At the beginning of an operation we prefer to have the reaction towers at least about half full of said complex although said complex may be formed in situ by the combination of hydrocarbons with aluminum chloride in the presence of hydrogen chloride. The fresh complex is relatively non-viscous and has a specific gravity about twice as great as that of the charging stock so that when charging stock is introduced at the base of the reactor it flows as a dispersed phase upwardly through said complex, thus effecting intimate contact between the charging stock and the complex. The incoming charging stock is mainly in the liquid phase but it may be partially vaporized by the gaseous hydrogen, about half of the volume of the upflowing stream being gaseous because of the introduced hydrogen which serves the function of promoting turbulence and effecting intimate mixing of charging stock and complex. Based on stock charged and the total amount of complex in the reactor the space velocity should be within the approximate range of .2 to 4 volumes of liquid feed per hour per volume of complex in the reactor, preferably about ½ v./hr./v. to 2 v./hr./v.

In the upper part of the reactor sufficient settling space is provided for permitting separation of complex from the clear reaction products. To insure adequate settling we either increase the cross-sectional area of the upper part of the reactor or provide a separate chamber of large horizontal cross-sectional area. This enlarged upper section or separate chamber has two important functions: (1) it provides a soaking drum wherein dissolved catalyst may effect further isomerization of the substantially clear products for obtaining a more desirable product distribution, and (2) it provides a large cross-sectional area for substantially complete separation of any entrained complex so that this complex may be returned to the reactor before the products enter the cooler. The settled complex is returned to the reactor and the clear products are passed through a cooler to a low pressure settling chamber for the release of hydrogen chloride and dissolved catalyst.

At room temperature and atmospheric pressure only about 0.10 grams of aluminum chloride can be dissolved in a liter of light naphtha. Under the reaction temperature and pressure about 50 to 75 times as much aluminum chloride may be held in solution. It is essential that dissolved catalyst material whether aluminum chloride or complex, be removed from the products before they enter the fractionation system not only because of catalyst losses which would otherwise be suffered but because of the complications and expense that would be encountered in handling a product containing such dissolved catalyst material. An important feature of our invention is the catalyst separation at reduced temperature and pressure so that the catalyst may be returned directly to the reactor as a complex or slurry. The gases containing hydrogen chloride may be scrubbed by a portion of the charging stock for recovering the hydrogen chloride and the substantially catalyst-free products may be charged to a hydrogen chloride stripper and thence to a fractionation system.

We have found that a considerable amount of hydrogen chloride may be recovered from the products in a simple stripping column which is operated at a pressure of about 200 pounds per square inch, a top temperature in the approximate range of 100 to 150° F. and a bottom temperature in the approximate range of 300 to 400° F. The final products are neutralized with caustic, water washed and, if necessary or desirable they may be fractionated or stabilized.

We may employ a multi-stage reaction with complex, the first stage being with relatively spent complex at relatively high temperature and the second step with relatively fresh complex at a lower temperature. Complex from the low temperature stage may be transferred to the high temperature stage. Substantially constant complex activity may be maintained in each zone by the addition of active materials thereto and the withdrawal of relatively spent catalyst therefrom. Since the amount of make-up catalyst added and spent complex withdrawn is quite small, the column of complex in the reaction zone is relatively stationary. The term "relatively stationary" does not mean "quiescent" because there will of course be a certain amount of turbulence within the column itself. The term "relatively stationary" means rather that the catalyst column is relatively fixed or stationary with regard to charging stock flow as distinguished from concurrent and countercurrent flow respectively. Hydrogen chloride may be recovered from the spent catalyst by treatment with water or sulfuric acid.

The invention will be more fully understood from the following detailed description of a specific example thereof read in connection with the accompanying drawings which form a part of this specification and in which:

Figure 1 is a diagrammatic flow sheet of our improved process as applied to a 1000 barrel per day isomerization plant for $C_5$—$C_6$ hydrocarbons, and Figure 2 is an enlarged detail of our improved reactor and separation system illustrating the separation zone above the column of complex in the reactor, the multiple stage catalyst separation prior to hydrogen chloride stripping and the neutralization of stripped products.

About 5000 barrels per day of light naphtha is charged by pump 10 through heat exchanger 11 to an intermediate point of light naphtha fractionator 12 which may be about 4½ feet in diameter by about 50 to 55 feet high. This fractionator is provided with conventional heating means 13 at its base and is operated under such conditions that pentanes and hexanes are taken overhead while heptanes and heavier hydrocarbons are withdrawn from the base of the column through line 14. The hexanes, pentanes and any butanes that may be present are taken overhead through line 15 and cooler 16 to reflux drum 17. A portion of the reflux condensate is returned by pump 18 through line 19 to the top of the fractionator to serve as reflux. When substantially butane-free charging stock is desired the rest of the reflux condensate may be withdrawn from the system through line 20. In this case the pentanes and hexanes are withdrawn as a side stream by pump 21 through cooler 22, about 90% or more of this stream being introduced through line 23 to the top of absorber 24 and the rest of the stream (or a pretreated or recycled stream) being introduced through line 25 to aluminum chloride slurry tank 26. We may, however, leave any butanes in the charging stock so that the side stream draw-off is unnecessary. For example, about 900 barrels per day or more of reflux condensate may be introduced through lines 27 and 23 to the top of the absorber and about 100 barrels per day or less of the reflux condensate may be introduced through line 28 and line 25 to slurry tank 26.

The hydrogen chloride required for the reaction is absorbed in the major portion of the feed stock before it is admixed with the aluminum chloride or introduced into the reactor. The hydrogen chloride absorber may be about 1½ feet in diameter by 28 feet high and it may operate at a pressure of about 100 to 300, for example about 250 pounds per square inch. A stream of hydrogen chloride gases from the system is introduced at the base of this absorber through line 29. Make-up hydrogen chloride may be introduced through line 30. Instead of make-up hydrogen chloride we may employ chlorine, an alkyl chloride or other substance which will supply the necessary halogen halide activator under reaction conditions. We prefer, however, to employ hydrogen chloride and to generate it if necessary in a separate generator.

The hydrogen chloride generator 31 may be of any known type. The chlorine supplying agent introduced through line 32 is preferably chlorine gas although it may be sodium chloride, muriatic (hydrochloric) acid or other halogen containing reagent. The hydrogen supplying agent introduced through line 33 may be hydrogen gas, a hydrocarbon, sulfuric acid, etc. Thus hydrogen and chlorine may be burned in generator 31 to supply hydrogen chloride. Wax tailings or other hydrocarbons may be introduced through line 33 and chlorinated by chlorine gas introduced by line 32 to produce hydrogen chloride and chlorinated hydrocarbons (additional hydrogen chloride may of course be obtained from the latter). Sodium chloride or hydrochloric acid may be introduced through line 32 and sulfuric acid through line 33 but in our system this hydrogen chloride generator operates under such pressure that no compressors are required for introducing the hydrogen chloride through line 34 to the base of absorber 24 and this hydrogen chloride does not require the purification which is generally necessary even for the production of commercial grades of hydrochloric acid. By-products from the hydrogen chloride generator are withdrawn through line 35.

The hydrogen chloride picked up in absorber 24 should be sufficient to give an amount of hydrogen chloride in the stock entering the reactors within the approximate range of 2% to 10%, i. e., in the general vicinity of 5% by weight based on stock charged. From about ½ to about ⅔ or more of this hydrogen chloride may be obtained by gases from line 29. Unabsorbed gases such as small amounts of hydrogen, methane, etc. are purged from the system through line 36, thus eliminating not only gaseous impurities from line 29 but also gaseous impurities from line 34.

The hydrogen chloride rich charging stock from the base of absorber 24 is pumped by pump 37 through heater 38, through lines 39 and 40 to the base of first reactor 41 at a pressure within the approximate range of 500 to 1500 pounds per square inch, for example about 850 or 900 pounds per square inch. Hydrogen from source 42 (or from other sources that will be hereinafter described) is introduced by compressor 43 and line 44 into line 39 in amounts within the approximate range of 100 to 300, for example about 200 cubic feet per barrel of stock charged to the reactor (the hydrogen being measured at 60° F. and atmospheric pressure). Aluminum chloride from source 45 is introduced through suitable feeding means 46 into slurry tank 26 at such a rate that the amount of aluminum chloride in the slurry is about one or two pounds per gallon. Based on total charging stock introduced into the reactor, the amount of aluminum chloride introduced through line 39 by pump 47 and line 48 is within the approximate range of .1 to 4 pounds, preferably about .5 or 2 pounds per barrel of charging stock. The stream entering reactor 41 through line 40 may be at a temperature within the approximate range of 200° F. to 300° F., for example about 250° F. The aluminum chloride slurry is preferably introduced as a separate stream to avoid line plugging at or near the point where the slurry meets the hydrogen chloride-charging stock stream.

Reactor 41 may be a vertical tower about 5 or 6 feet in diameter by about 18 or 20 feet tall. It is desirable that the depth of the catalyst in the reactor be at least about three to ten feet, preferably at least five feet. When the reaction is initiated this reactor may be about half filled with an aluminum chloride-hydrocarbon complex the density of which is within the approximate range of 1.2 to 1.7 but which may be maintained during the reaction within the general vicinity of 1.5 by methods hereinafter described. The density of the liquid hydrocarbon charging stock is less than half that of the complex. The charging stock is chiefly in the liquid phase but some of it will be vaporized by the upflowing gases which constitute about one-half the volume of the upflowing stream and which produce turbulence and intimate mixing in the reaction tower. The space velocity should generally be within the approximate range of .2 to 4 volumes of liquid charging stock per hour per volume of complex in the reactor or reactors and under preferred operating conditions with a single reactor it should be within the general vicinity of ½ to 2 volumes of liquid charging stock per hour per volume of catalyst complex in the reactor or reactors. Higher space velocities may, of course, be employed in an individual reactor where a plurality of reactors are employed in series.

Catalyst complex settles from the upflowing reaction products in the top of the tower as illustrated in Figure 2 and if desired the tower top may be enlarged to provide increased settling area. We prefer, however, to withdraw the reaction products from the tower top through lines 49 and 50 to a soaking drum or warm settling chamber 51 which may be a horizontal or slightly inclined drum about 3 feet in diameter by about 10 feet long. We have discovered that there is a large amount of dissolved catalyst in the products at this point and this dissolved catalyst in a soaking zone may have a beneficial effect on product distribution. In other words, the isomerization equilibrium in drum 51 is not the same as in reactor 41 and this supplemental contact with dissolved catalyst in drum 51 may contribute to additional formation of desired isomerization products.

Drum 51 also serves the important function of removing any undissolved complex, the separated complex being withdrawn from the base of the drum through line 52 and returned without necessity of pumping. Complex removal at this point helps to prevent fouling of the heat exchanger when clear products are withdrawn through line 53, through cooler (heat exchanger) 54 and pressure reduction valve 55 to the cool settling drum 56 which is maintained at a temperature of about 100° F. or less and at a pressure within the approximate range of 100 to 300, for example about 250 pounds per square inch. The cool settler may be a horizontal or slightly inclined drum about 5 or 6 feet in diameter and about 16 feet in length. Released gases leave the top of the cool settler 56 through line 57 which discharges into line 29. The reduced pressure and cooling effects a considerable precipitation of catalyst material in the cool settler and the precipitated catalyst material is withdrawn as a slurry from the base of this settler by means of pump 58 in line 59.

The clear product which is now substantially free from catalyst and which contains only a small amount of hydrogen chloride is withdrawn through line 60 and introduced by pump 61 into hydrogen chloride stripping tower 62 which may be a column about 3 feet in diameter and about 33 feet in height. This stripping column may be provided with heating means 63 at its base and it may be operated at a pressure of about 200 pounds per square inch with a top temperature within the approximate range of 100 to 150° F. and a bottom temperature within the approximate range of 300 to 400° F. The removed hydrogen chloride together with released gases such as hydrogen, methane, ethane, etc. is taken overhead through line 64 to line 29. As hereinafter pointed out, this stripper may also serve the function of a stabilizer.

The liquid from the base of the stripper is introduced at a low point in scrubbing tower 65 either directly through line 66 or through a cooler 67. Scrubber 65 may be a tower about 4 feet in diameter and about 32 feet in height and it may be provided with suitable baffles, trays or bubble plates for effecting intimate contact of the upflowing products with a concentrated caustic solution introduced through line 68. The upflowing neutralized products are washed free from caustic in the upper part of the tower by water introduced through line 69. Spent caustic solution is withdrawn from the base of the scrubber through line 70. The wash water may be withdrawn from a trapout plate above the point of caustic inlet if desired.

The water washed product may be withdrawn as such or it may pass from the top of scrubber 65 through line 71 and heat exchanger 72 to an intermediate point in stabilizer 73. This stabilizer is provided with conventional heating means 74 at its base. Butanes and any lighter products may be taken overhead through line 75 through cooler-condenser 76 to reflux drum 77 from which gases may be vented through line 78. Condensed reflux may be returned by pump 79 through line 80 to the top of stabilizer 73. A stream consisting chiefly of butanes may be withdrawn from the system through line 81.

If desired a single "isomate" fraction may be withdrawn from the base of the stabilizer through heat exchanger 72 and line 82. We may, however, withdraw only the heaviest isomate at this point and we may withdraw a light isomate as a side stream through line 83. The isomate may be fractionated to insure the removal of any heptanes or heavier products which may be formed and to obtain a product of desired Reid vapor pressure for blending in desired amounts with isooctane to make a super aviation fuel. A representative analysis of isomate produced in this system may be approximately as follows:

|  | Per cent by volume |
|---|---|
| Isobutane | 2 |
| Isopentane | 31 |
| n-Pentane | 5 |
| Cyclopentane | 3 |
| 2-methyl pentane | 18 |
| 3-methyl pentane | 8 |
| 2-2-dimethyl butane | 20 |
| 2-3-dimethyl butane | 2 |
| n-Hexane and heavier | 11 |

If neohexane is a desired end product it may be separately fractionated and the other isohexanes may be recycled for the production of further amounts of neohexane.

Returning to the reaction system, we may employ a second reactor 84 of about the same size as the first reactor 41. Products from the first reactor instead of going to the warm settler through line 50 may pass through line 85 and heat exchanger 86 into the base of this second reactor 84. The operating conditions in the second reactor may be substantially the same as in the first reactor although we prefer to operate the second reactor at a lower temperature than the first reactor. Thus with the first reactor at 300° F. or more the second reactor may be at about 250° F. Products from the top of the second reactor pass through line 87 to the soaking drum or warm settler 51 as hereinabove described.

Instead of operating the reactors in series they may be operated in parallel by passing only a part of the charging stock through line 40 to the first reactor and by passing the remainder of the charging stock through line 88 to the base of the second reactor. By means of this arrangement one reactor may be on-stream while another reactor is standing by for repair or replacement of catalyst complex.

In general the complex becomes more viscous with age and up to a certain point the catalyst becomes more active with this increasing viscosity. These characteristics are apparently determined to a certain extent by the hydrocarbon content of the complex. Fresh complex may contain up to about 37% hydrocarbon but when complex is made in situ in the presence of a large amount of aluminum chloride and after catalyst has been used for a period of time it may contain only 10 or 15% hydrocarbon, the balance consisting chiefly of aluminum chloride. We have found that the catalytic activity of the complex may be maintained substantially constant by withdrawing a portion of the catalyst from the base of the reactors at about the same rate as an additional amount of aluminum chloride is added thereto either in the form of relatively fresh complex or in the form of an aluminum chloride slurry. Thus catalyst from the second reactor may be withdrawn through line 89 by means of pump 90 and either introduced through lines 91 and 92 to the first reactor, withdrawn from the system through line 93, or introduced through line 94 to hydrogen chloride recovery drum 95. Catalyst from the base of the first reactor may be withdrawn through line 96 by means of pump 97 and introduced through line 98 to the second reactor, withdrawn from the system through line 99 or passed to the hydrogen chloride recovery drum through line 100. If the second reactor operates at a lower temperature than the first reactor when in series therewith, we prefer to introduce catalyst from the second reactor through lines 91 and 92 to the first reactor and to remove catalyst through line 100 from the first reactor to the hydrogen chloride recovery drum 95. For such operation we prefer to introduce a part or all of the make-up aluminum chloride slurry from line 48 to the second reactor through by-pass line 101.

Settled catalyst complex from the soaking drum or warm settler 51 may be passed from line 52 through line 102 to slurry tank 26, or through lines 103 and 98 to second reactor 84 or through lines 104 and 92 to first reactor 41. Catalyst slurry from cool settler 56 may be passed from line 59 through lines 105 and 102 to slurry tank 26, or through lines 106 and 98 to second reactor 84 or through lines 107, 104 and 92 to first reactor 41. The liquid from the base of these settlers may not be desirable for making a slurry of aluminum chloride because such liquid contains hydrogen chloride and complex. We prefer to use a part of the cooled liquid from the base of stripper 62 through line 108 because such liquid makes a slurry that has even less tendency to settle out and to plug transfer lines than the slurry made with a part of the untreated fresh feed. Alternatively we may return recycled isomerization products, chiefly methyl pentanes, from line 82 through lines 108' and 102 for making up the aluminum chloride slurry in tank 26. Instead of recycling isomerized products for making up the aluminum chloride slurry we may pre-treat with aluminum chloride that portion of the charging stock with which the slurry is to be made up since a slurry made with such pre-treated charging stock is more stable than a slurry made with untreated charging stock.

Spent sludge may be discarded from the system but we prefer to introduce it into drum 95 and to add to the sludge in this drum through line 109 a sufficient amount of sulfuric acid or water to effect recovery of anhydrous hydrogen chloride. The recovered hydrogen chloride is passed through line 110 to line 29 and absorber 24. The sulfuric acid sludge or cokey residue is withdrawn from drum 95 through line 111. If water is employed it should be used in less than stoichiometric amounts in order that the recovered hydrogen chloride may be substantially anhydrous; the sludge will thereupon be converted into a cokey mass that may be removed from the drum by hydraulic or other conventional decoking means. A larger amount of anhydrous hydrogen chloride may be recovered by the use of sulfuric acid and the resulting sulfuric acid sludge may be charged to a conventional sludge coker system for the recovery of sulfuric acid.

Instead of employing relatively pure hydrogen from source 42 we may obtain hydrogen from refinery gases which are rich in hydrogen. Such gases may be introduced through line 112 to absorber 113 which may operate at about 100° F. under a pressure of about 900 pounds per square inch. Absorber oil may be butane from line 20 and line 114. Such oil may be introduced by pump 115 through line 116 to the upper part of the absorber tower for picking up the methane, ethane, ethylene, propane, propylene, etc. in the refinery gases. The unabsorbed hydrogen will pass overhead through line 117 to be picked up by compressor 43. The rich absorber oil will pass through line 118 and pressure reducing valve 119 to receiver 120 from which the hydrocarbon gases may be vented to fuel lines or other parts of the refinery through line 121 and the denuded oil may be returned by line 122, pump 115 and line 116 back to the top of the absorber. Purge gas from absorber 24 may be introduced to the hydrogen absorption system through line 36a.

The hydrogen chloride stripper 62 may also serve as a stabilizer. We may take overhead most of the butanes and all of lighter gases through cooler 123 to receiver 124. The hydrogen chloride, methane, ethane and propane may leave the top of this receiver through line 125 and be passed by line 29 to absorber 24 thus recycling buffering gases as well as hydrogen chloride. A part of the butane may be returned through line 126 to serve as reflux in the top of the stripper tower and the rest of the butanes (which contain substantial amounts of isobutane) may be withdrawn through line 127. If this withdrawn isobutane is to be employed in an aluminum chloride alkylation process it will require no caustic wash but a suitable caustic wash and water wash may be employed if the butanes are to be used for other purposes. When tower 62 thus serves the function of a stabilizer it may be entirely unnecessary to employ stabilizer 73 and final isomate may be withdrawn from the system through line 128. From time to time propane and ethane may be purged from the system through line 127.

The plant hereinabove described is designed to produce approximately 98 volume percent yields of butane free high octane number isomate. A comparison of a charging stock with the resulting isomate is substantially as follows:

|  |  | Charge | Isomate |
| --- | --- | --- | --- |
| Initial boiling point | ° F | 114 | 97 |
| 10% point | ° F | 118 | 109 |
| 50% point | ° F | 128 | 121 |
| 90% point | ° F | 146 | 145 |
| End point | ° F | 152 | 180 |
| Reid vapor pressure | pounds | 10.2 | 10.7 |
| A. S. T. M. octane number |  | 69 | 81 |
| With 1 cc./gal. lead tetraethyl |  |  | 92 |
| With 2 cc./gal. lead tetraethyl |  |  | 100 |

The fractionation systems hereinabove described are shown diagrammatically in the drawings and it should be understood that where pentanes, hexanes or a desired mixture of pentanes and hexanes are to be separated from lighter or heavier hydrocarbons one or more separate fractionating towers or stripping towers will be employed in actual practice instead of simple side stream draw-offs. Thus tower 12 may be employed for effecting a separation between heptane and heavier bottoms and hexanes and lighter overhead products, a second tower may effect the separation of hexane bottoms from pentane and lighter overhead products and a third tower may effect separation of pentane bottoms from butane and lighter overhead products. The heptane content of our charging stock should preferably be maintained well below 5%. A plurality of towers will likewise be used in those cases where it is desirable to separate neohexane from a heavier recycle stock.

The particular arrangement of coolers herein described constitutes an important feature of our invention but other features of our invention are relatively independent of this arrangement and under certain circumstances warm settler 51 may be by-passed or other means may be employed for effecting the desired separation of catalyst material from isomerization products.

In the preparation of make-up hydrogen chloride in generator 31 we may employ an excess of hydrogen or of gases which are rich in hydrogen (for instance purged gases from line 36). The generator may be at sufficiently high pressure so that the hydrogen chloride together with the excess of hydrogen may be introduced directly into reactor 41 instead of into absorber 24. Alternatively, we may generate the hydrogen chloride at relatively low pressure and either compress the generated gas or absorb it in part or all of the incoming charging stock at relatively low pressure and then pump the hydrogen chloride containing charging stock up to the pressure of absorber 24 or reactor 41.

It has already been indicated that the soaking drum or warm settler 51 may be an integral part of the reactor and may constitute an enlarged upper part of the reactor. Steam jackets, electrical heating means or the like may be employed for maintaining the desired temperature in the reactor and in the soaking drum or warm settler. Instead of introducing make-up aluminum chloride as a slurry we may pre-form make-up catalyst complex and introduce this pre-formed complex into each reactor either with the incoming charging stock or at a point in the reactor above the charging stock inlet. Where pre-formed catalyst complex is employed or when there is a negligible production of methane and ethane, we may recycle the hydrogen as well as the hydrogen chloride since the necessity for purging will thus be substantially eliminated. We may recycle hydrogen and hydrogen chloride directly from the top of each reactor to the base thereof and draw off the liquid products from a point in the reactor below the reactor top. The aluminum chloride may be introduced into the system in solution with charging stock or butane or with recycled isobutane instead of as a slurry. These are only examples of the many modifications and alternative operations which may be employed and other modifications and alternatives will be apparent to those skilled in the art from the above detailed description.

We claim:

1. The method of recovering isomerization products from an aluminum halide conversion system which method comprises removing said products from a relatively stationary column of liquid aluminum halide-hydrocarbon complex isomerization catalyst in an isomerization zone, separating undissolved aluminum halide-hydrocarbon complex from reaction products at substantially reaction temperature and pressure cooling the resulting clear products and passing the cooled products prior to fractionation into a settling zone at reduced pressure, removing gases from the top of said settling zone, removing precipitated catalyst material from said settling zone, introducing clear product liquids from said low pressure settling zone into a stripping zone, removing further amounts of gases from said products in said stripping zone, treating the liquids from said stripping zone with a neutralizing agent, and fractionating the neutralized products.

2. A process for isomerizing a charging stock consisting essentially of pentanes and hexanes which process comprises maintaining in a reaction zone a relatively stationary column of liquid aluminum halide-hydrocarbon complex at isomerization temperature and under sufficient pressure to maintain liquid phase reaction conditions in said column, continuously introducing charging stock, hydrogen halide and hydrogen at a low point in said column, continuously separating liquid conversion products and unconsumed hydrogen halide and hydrogen from complex at the top of said column, continuously withdrawing said separated liquid conversion products and unconsumed hydrogen halide and hydrogen from the reaction zone, cooling said withdrawn conversion products and unconsumed halide and hydrogen and passing them prior to fractionation into a settling zone, removing gases from the top of said settling zone, removing catalyst material from said settling zone, introducing product liquid from said settling zone into a stripping zone, removing further amounts of gases from said product in said stripping zone, treating liquid products from said stripping zone with a neutralizing agent, and fractionating said product after said treating step.

3. The isomerization process which comprises preparing a saturated paraffinic hydrocarbon charging stock substantially free from hydrocarbons higher boiling than hexane and from hydrocarbons lower boiling than butane, absorbing in said charging stock an amount of hydrogen chloride within the range of about 2% to 10% by weight, heating said charging stock to an isomerization temperature in the range of about 100° to about 300° F. under sufficient pressure to maintain it in liquid state, maintaining in a conversion zone a deep pool of liquid aluminum chloride-hydrocarbon complex catalyst having a specific gravity within the range of about 1.2 to 1.7, passing said heated charging stock in liquid state as a dispersed phase upwardly through said liquid catalyst pool under isomerization conditions including a temperature in the range of 100° to 300° F., a pressure within the range of 100 to 1500 pounds per square inch and sufficient to maintain hydrocarbons in the conversion zone in liquid state, and a space velocity within the approximate range of about .2 to 4 volumes of charging stock per hour per volume of complex in said pool, separating entrained complex from liquid hydrocarbons in the conversion zone above said pool and returning said separated complex by gravity to said pool, withdrawing as a liquid from the conversion zone hydrocarbon products from which entrained complex has been separated, cooling said withdrawn liquid products and passing the cooled products prior to fractionation into a settling zone, introducing product liquid from the settling zone into a stripping zone, removing gases from said products in said stripping zone, treating the product liquid from said stripping zone with a neutralizing agent and fractionating said product after the treating step.

4. The process of claim 3 which includes the further step of introducing hydrogen gas at the base of said pool along with the introduced charging stock.

5. The process of claim 3 wherein the distance from the charging stock inlet to the upper level of said pool is at least about 5 feet.

6. An isomerization process which comprises preparing a saturated paraffinic hydrocarbon charging stock boiling substantially within the butane to hexane boiling range, adding to said charging stock a sufficient amount of hydrogen chloride to serve as an isomerization promoter, heating said charging stock to an isomerization temperature under a pressure sufficient to maintain the hydrocarbons in liquid state, maintaining in a conversion zone a deep pool of liquid aluminum chloride-hydrocarbon complex catalyst having a specific gravity approximately twice that of the charging stock, passing said heated charging stock in liquid state as a dispersed phase upwardly through a column of liquid catalyst in the pool which column is at least about 3 feet in height while maintaining the pool at an isomerization temperature and under a pressure sufficient to maintain the dispersed hydrocarbon charging stock in liquid phase in said column, separating entrained complex catalyst from liquid hydrocarbons in the conversion zone above said pool and returning said separated complex by gravity to said pool, withdrawing liquid hydrocarbon product from the upper part of said conversion zone after at least a portion of said complex has been separated therefrom, cooling the withdrawn product, introducing the cooled product into a settling zone, removing gases from the top of said settling zone, removing catalyst material from said settling zone, introducing product liquid from said settling zone into a stripping zone, removing further amounts of gases from said product liquid in said stripping zone, treating liquid product from said stripping zone with a neutralizing agent and fractionating said product after said treating step.

7. An isomerization process which comprises maintaining in a conversion zone a deep pool of liquid aluminum chloride-hydrocarbon complex catalyst having a density within the approximate range of about 1.2 to 1.7, introducing a paraffinic charging stock consisting essentially of saturated hydrocarbons boiling within the butane to hexane boiling range together with an effective amount of hydrogen chloride at a low point in said pool at an isomerization temperature, passing said charging stock as a dispersed phase in liquid state upwardly through the liquid catalyst complex under conditions for effecting isomerization, withdrawing the effluent product stream from the upper part of said conversion zone into a high temperature settling zone which is outside of said conversion zone but at substantially the same temperature and pressure as the conversion zone, withdrawing product liquid from said high temperature settling zone through a cooling zone and cooling said liquid in said cooling zone, passing the cooled liquid into a low temperature settling zone which is at lower pressure than the pressure in the conversion zone, introducing product liquid from said low temperature settling zone to a stripping zone, removing gases from said liquid in said stripping zone, treating liquid from the stripping zone with a neutralizing agent and subsequently fractionating said treated liquid.

8. The method of effecting isomerization of a hydrocarbon charging stock which method comprises maintaining a pool of liquid aluminum chloride-hydrocarbon complex catalyst material having a density substantially greater than that of the hydrocarbon charging stock in a conversion zone up to a level spaced from the top of said zone, dispersing an isomerizable liquid hydrocarbon charging stock which is lighter than the catalyst material into said pool at a low level, passing dispersed liquid charging stock upwardly through said pool under isomerization conditions of temperature and space velocity and in the presence of sufficient hydrogen chloride to promote isomerization, separating entrained liquid catalyst material from liquid hydrocarbons in a first separation zone forming a part of the conversion zone above the level of the pool, returning the separated liquid catalyst material to said pool, withdrawing from the upper part of the first separation zone hydrocarbons which contain only residual amounts of catalyst material, cooling said withdrawn hydrocarbons and introducing them after the cooling step to a second separation zone outside of the conversion zone, separating residual catalyst material from hydrocarbons in said second separation zone, and treating the hydrocarbons from the second separation zone to remove hydrogen chloride and to effect neutralization of said hydrocarbons.

9. The method of isomerizing an isomerizable hydrocarbon charging stock which comprises maintaining in a contacting zone a deep pool of liquid aluminum chloride-hydrocarbon complex catalyst material which is of greater density than the hydrocarbon charging stock and which forms a separate liquid phase when admixed with liquid hydrocarbon charging stock, dispersing liquid charging stock together with an effective amount of hydrogen chloride at a low level in said pool and passing said dispersed liquid charging stock upwardly through said pool under conditions of temperature and space velocity to effect substantial isomerization, withdrawing liquid hydrocarbons from the top of the pool into a first separation zone at substantially reaction temperature and pressure, returning separated liquid catalyst material from the first separation zone to said pool, withdrawing hydrocarbons containing only residual catalyst material from the first separation zone to a cooling zone and cooling said hydrocarbons in said cooling zone, withdrawing the cooled hydrocarbons to a second separation zone, removing residual catalyst material in the second separation zone, removing gases from liquid hydrocarbons in the second separation zone, and treating the liquid hydrocarbons from the second separation zone to effect removal of dissolved hydrogen chloride and to effect neutralization of said hydrocarbons.

CECIL W. NYSEWANDER.
NATHAN FRAGEN.